United States Patent

Baughman

Patent Number: 5,142,909
Date of Patent: Sep. 1, 1992

[54] MATERIAL LEVEL INDICATOR

[76] Inventor: James S. Baughman, 16341 E. 8 Mil Rd., Stanwood, Mich. 49346

[21] Appl. No.: 85,377

[22] Filed: Aug. 14, 1987

Related U.S. Application Data

[63] Continuation-in-part of Ser. No. 912,434, Sep. 29, 1986, abandoned.

[51] Int. Cl.$^5$ ............................................. G01F 23/26
[52] U.S. Cl. .................................. 73/304 C; 361/284; 338/38
[58] Field of Search ................. 73/304 C, 304 R, 295; 340/622; 361/284; 338/27, 38, 292, 295, 288, 289, 44, 99, 114, 56, 222

[56] References Cited

U.S. PATENT DOCUMENTS

| | | | |
|---|---|---|---|
| 3,485,100 | 12/1969 | Peterson | 73/295 |
| 3,588,859 | 6/1971 | Petree | 340/620 |
| 3,935,739 | 2/1976 | Ells | 73/304 C |
| 4,036,053 | 7/1977 | Jenkins | 73/295 |
| 4,371,790 | 2/1983 | Manning et al. | 73/304 R |
| 4,425,795 | 1/1984 | Albrecht et al. | |
| 4,461,175 | 7/1984 | Baumgart et al. | 73/304 R |
| 4,466,282 | 8/1984 | Kuhnel | 73/304 R |
| 4,555,941 | 12/1985 | Fathaver et al. | 73/304 C |
| 4,567,762 | 2/1986 | Hoppert et al. | 73/304 R |
| 4,589,077 | 5/1986 | Pope | 361/284 |
| 4,601,201 | 7/1986 | Oota et al. | 361/284 |
| 4,648,087 | 3/1987 | Scranton et al. | 360/110 |

FOREIGN PATENT DOCUMENTS

| | | | |
|---|---|---|---|
| 3148383 | 4/1987 | Fed. Rep. of Germany . | |
| 0093024 | 7/1980 | Japan | 73/304 R |
| 2127555 | 4/1984 | United Kingdom | 73/304 R |

OTHER PUBLICATIONS

SAE Paper No. 830106-An Advanced Electrothermal Sensor for Automotive Level Measurement-Haub et al.

Primary Examiner—Thomas B. Will
Attorney, Agent, or Firm—Krass & Young

[57] ABSTRACT

A system for indicating level of material in a vessel comprising a probe which includes a plurality of electrically discrete probe elements of electrically conductive construction position within a material vessel in a spaced array extending height-wise of the vessel. Each probe element has electrical characteristics which vary as a function of proximity of material thereto within the vessel. In one embodiment, the probe elements comprise capacitive elements responsive to varying dielectric characteristics as material approaches each element. In another embodiment, having particularly utility in fuel level sensing applications, the probe elements comprise resistance elements responsive to cooling through immersion in fuel for varying voltage drop thereacross. Electonic circuitry is coupled to the several probe elements for detecting material level as a function of electrical characteristics of the probe elements. Preferably, such level detection is accomplished in discrete steps corresponding to separation between probe elements.

8 Claims, 3 Drawing Sheets

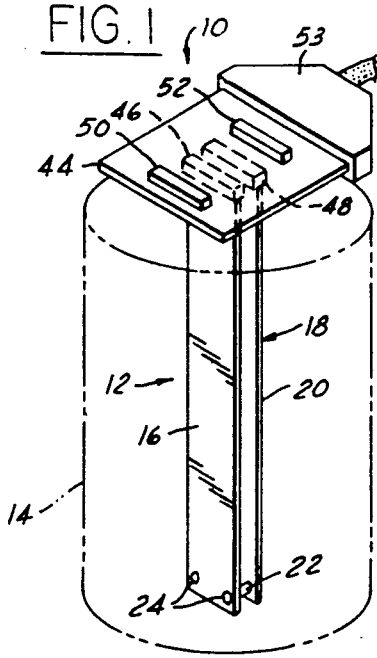
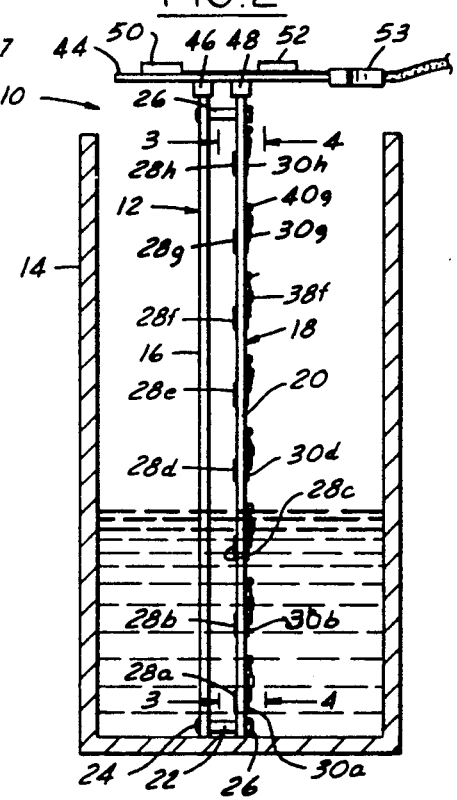
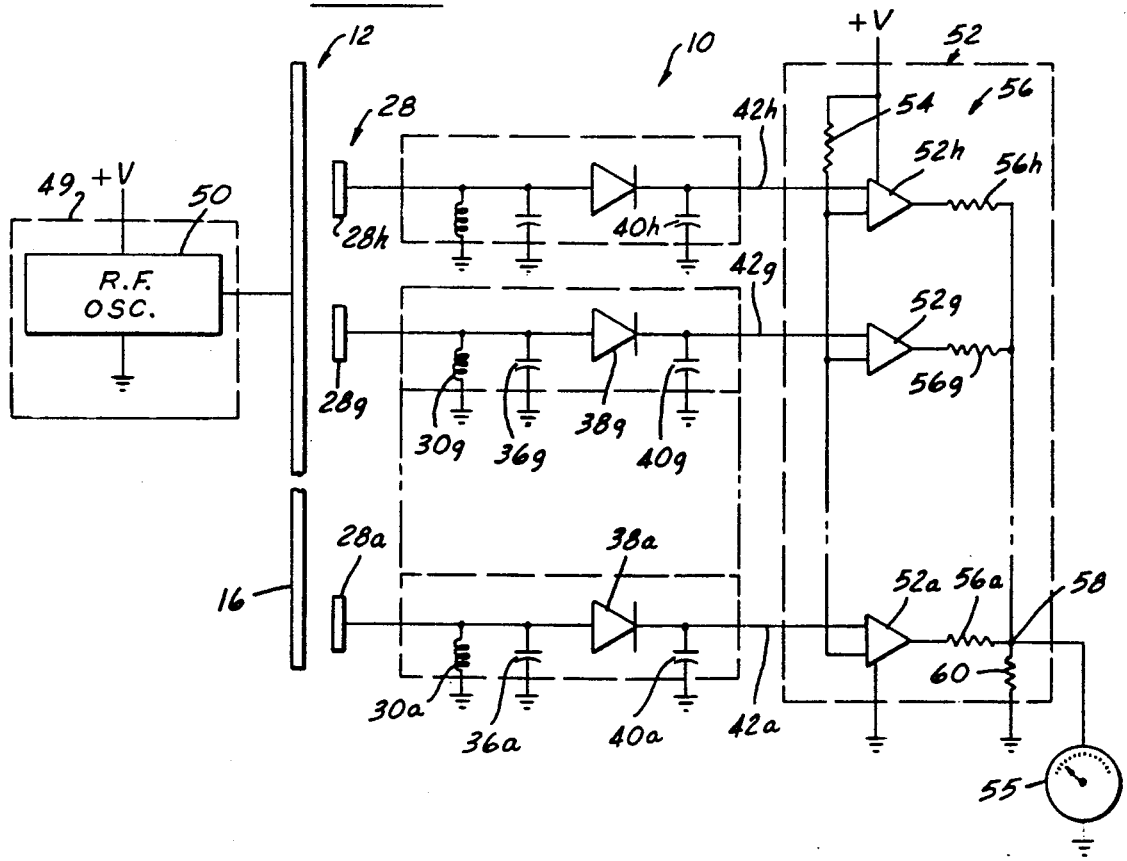

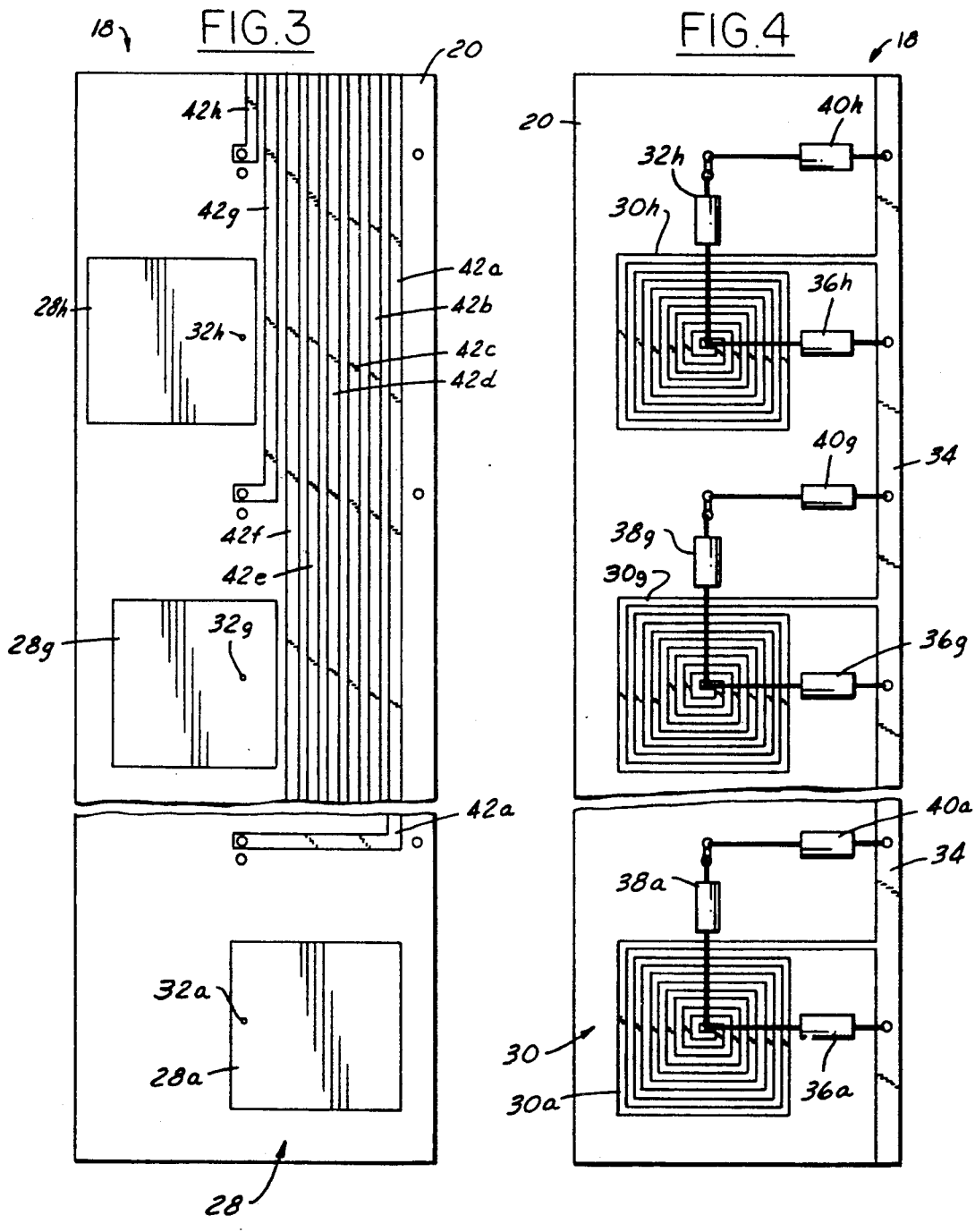

MATERIAL LEVEL INDICATOR

This application is a continuation-in-part of application Ser. No. 912,434 filed Sept. 29, 1986 and now abandoned.

The present invention is directed to a system for indicating level of material in a vessel, and more particularly to a material level indicating system responsive to electrical characteristics of a probe immersed in the material for indicating material level.

BACKGROUND AND OBJECTS OF THE INVENTION

The technology of electronic material level indication, particularly capacitance-type material level indication, has been employed in a number of applications, including measurement and display of fuel level in automotive and other vehicles. In general, capacitance-type systems of this character seek to measure and display material level as a function of the effective capacitance of material between a pair of measurement probe electrodes, one of which may be formed by the vessel wall, which capacitance varies with material level. A general problem in application of such technology to fuel level measurement lies in the fact that many fuels exhibit both electrically conductive and electrically capacitive characteristics. This problem is compounded in vehicles which can employ fuels of differing conductivity. Gasohol containing ten percent ethyl alcohol, for example, may possess a conductivity which is ten times that of regular unleaded gasoline. It is therefore desirable to provide a level indicating system which is immune or substantially immune to differing conductivities in the types of fuels which can be employed.

A general object of the present invention is to provide a system of the described character which is inexpensive in manufacture and is reliable in operation over a substantial operating lifetime and in a variety of operating environments.

Another and more specific object of the invention is to provide a material level indicating system of the described character which finds particular application in conjunction with materials of varying electrical conductivity, such as gasoline. In this implementation, it is another specific object of the invention to provide a system of the described character which is constructed to withstand the extremes of temperature and abuse to which such systems are subjected.

SUMMARY OF THE INVENTION

Briefly stated, a material level indicating system in accordance with the present invention comprises a probe which includes a plurality of electronically discrete probe elements of electrically conductive construction positioned within a material vessel in a spaced array extending heightwise of the vessel. Each probe element has electrical characteristics which vary as a function of proximity of material thereto within the vessel. In one embodiment of the invention, the probe elements comprise capacitive elements responsive to varying dielectric characteristics as material approaching each element. In another embodiment of the invention having particular utility in the fuel level sensing applications, the probe elements comprise resistance elements responsive to cooling through immersion in fuel for varying voltage drop thereacross.

Electronic circuitry is coupled to the several probe elements for detecting material level as a function of varying electrical characteristics of the probe elements. Preferably, such level detection is accomplished in discrete steps corresponding to separation between probe elements. In the disclosed embodiments of the invention, threshold detectors are coupled to corresponding probe elements for providing output signals as a function of proximity of material. The several detectors are coupled through a summing circuit, such as a weighted resistor network, for indicating material level as a function of the composite detector outputs.

In one embodiment of the invention, a capacitance probe includes a pair of spaced parallel-plate capacitance electrodes constructed to be positioned within a vessel such that material in the vessel is disposed therebetween at a level which corresponds to that within the vessel as a whole. An rf generator is coupled to one of the electrodes for transmitting rf energy into the vessel, and circuitry is coupled to the other electrode for indicating material level as a function of rf energy received at such second electrode. In accordance with the present invention, such system is characterized in that one of the electrodes comprises a plurality of discrete electrodes spaced from and parallel to the other electrode and spaced from each other in the direction of vessel height. The indicating circuitry embodies facility for indicating material level in discrete steps corresponding to the number of and separation between the discrete electrode elements.

In the preferred embodiments of the invention, the indicating circuitry includes a plurality of threshold detectors individually coupled to associated second electrode elements for indicating receipt of rf energy at such second electrode elements at a level above a preselected threshold Such threshold detection and discrete level indication is substantially immune to changes in conductivity of the material under test. The outputs of the various threshold detectors are coupled through an analog resistance summing junction to a meter for displaying material level to an operator. Meter resolution is a function of the number of and separation between sensing electrode elements.

In the capacitive embodiment of the invention, the first electrode comprises a conductive metal plate, and the discrete second electrodes comprise conductive foil zones printed onto a circuitboard to which the metal plate is mounted. The detection circuitry includes a parallel LC resonant circuits individually coupled to each foil zone and tuned to the frequency of the rf generator. Each resonant circuit inductor is formed by a spiral conductive foil printed on the circuitboard surface opposite to that of the conductive zones and connected to the associated zones through the circuitboard. Such printed spiral inductor is both less expensive and less susceptible to temperature variations as compared with separate inductor devices.

In another embodiment of the invention, which is presently preferred for fuel level applications, the probe comprises electrically discrete resistive elements having voltage continuously applied thereto so that heat energy is dissipated at each resistive element. Voltage drop across each resistor varies with temperature in the usual manner. Heat dissipation is greatly enhanced by immersion in fuel, with the result that the voltage drop across immersed resistance probe elements differs from that at elements not so immersed. The threshold detectors respond to such difference to indicate material level.

The resistance probe preferably comprises a continuous serpentine layer of resistive material on a substrate and having electrical contacts disposed in alternating sequences therealong. One sequence of elements is connected in common to a voltage source. The contacts of the other sequence are individually connected to the threshold detectors. The serpentine construction of the resistive layers, in combination with the alternating contact disposition, effects reliable electrical separation between resistance elements even though the same are mechanically interconnected.

BRIEF DESCRIPTION OF THE DRAWINGS

The invention, together with additional objects, features and advantages thereof, will be best understood from the following description, the appended claims and the accompanying drawings in which:

FIG. 1 is a perspective view of a material level indicating system in accordance with one presently preferred embodiment of the invention;

FIG. 2 is a side elevational view of the embodiment of FIG. 1 immersed in a partially-filled vessel;

FIGS. 3 and 4 are elevational views respectively taken along the lines 3—3 and 4—4 in FIG. 2;

FIG. 5 is an electrical schematic diagram of the embodiment of the invention illustrated in FIGS. 1–4.

DETAILED DESCRIPTION OF PREFERRED EMBODIMENT

Figure 6:
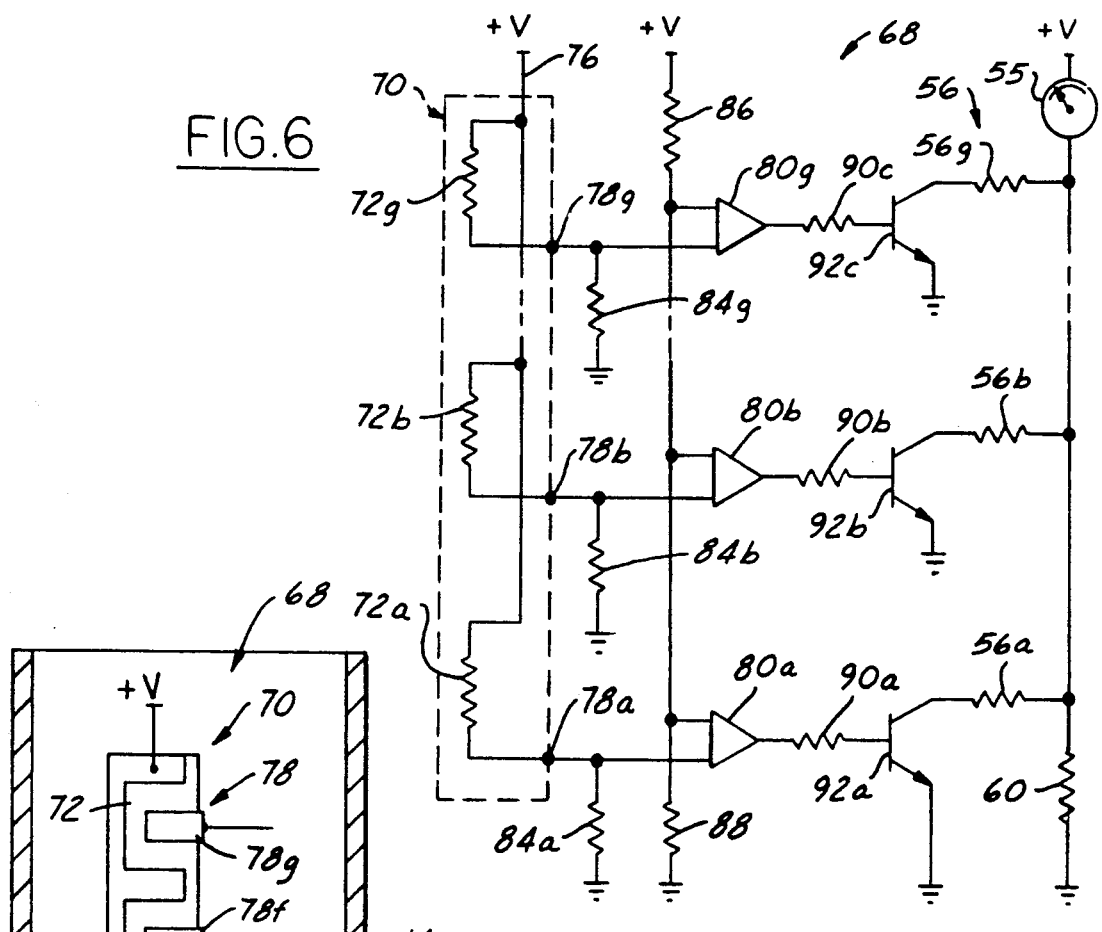
FIG. 6 is an electrical schematic diagram of another preferred embodiment of the invention.

FIGS. 1-5 illustrate a material level indicating system 10 in accordance with one presently preferred embodiment of the invention as comprising a capacitance probe 12 immersed in a material vessel 14. Probe 12 includes a flat rectangular plate 16 of electrically conductive metallic construction, such as brass, which forms a first capacitance electrode. A printed circuitboard assembly 18 includes a circuitboard 20 of generally rectangular insulating construction with an outline corresponding to that of plate 16. Plate 16 is affixed to circuitboard 18 in spaced parallel relation thereto by the spacers 22, screws 24 and nuts 26. On the surface of circuitboard 20 opposed to plate 16, a plurality of discrete conductive zones or pads 28 (FIGS. 2 and 3), specifically eight conductive zones or pads 28a–28h in the embodiment illustrated, are printed in an array spaced from each other in the direction of vessel height. Most preferably, for reasons that will become apparent, pads 28a–28h are most preferably uniformly spaced from each other in the direction of vessel height, with the lower pad 28a being disposed in assembly adjacent to the vessel bottom and the upper pad 28h being disposed in assembly adjacent to the vessel top. Pads 28 form discrete second electrodes which cooperate with plate 16 for effectively forming a corresponding plurality of discrete point-level indicating subprobes.

An array 30 of inductors 30a–30h (FIGS. 2 and 4) are printed on the surface of circuitboard 20 remote from plate 16. As best seen in FIG. 4, each inductor 30a–30h comprises a spiral printed conductor foil connected at the foil center through a plated through-opening 32a–32h to an associated electrode zone 28a–28h on the opposing surface of board 20, and connected at its outer end to a printed ground strip 34 which runs along one edge of circuitboard 20. As will be appreciated from FIG. 3, there is no necessity that through-openings 32a–32h be centered in the corresponding zone 28a–28h. A capacitor 36a–36h is connected between ground strip 34 and the center of each spiral inductor 30a–30h. The center of each spiral inductor 30a–30h is also connected through an associated diode 38a–38h and through a second capacitor 40a–40h to ground strip 34. The junction of each diode 38a–38h and its associated capacitor 40a–40h is connected through board 20 to a printed conductor 42a–42h. Conductors 42a–42h run parallel to each other to the 42h. Conductors 42a–42h run parallel to each other to the upper edge of board 20, electrode zones 28a–28h thus being progressively laterally offset in the illustration of FIG. 3 to permit passage of the conductor strips.

A second printed circuitboard assembly 44 (FIG. 1) is mounted on, and electrically connected by the edge-type connectors 46,48 to, the upper edges of plate 16 and circuitboard assembly 18 respectively. An rf generator 49 (FIGS. 1 and 5) comprising a fixed frequency oscillator 50 is carried by circuitboard assembly 44 and feeds rf energy through connector 46 to plate 16. Conductors 42a–42h are connected through connector 48 to an array 52 (FIGS. 1 and 5) of threshold detectors 52a–52h. The output of array 52 is fed through a connector 53 to an analog meter 55 for indicating material level. Electrical power from a battery 57 (or vehicle generator) is fed to the level-indicating circuitry through connector 53. Most preferably, circuitboard assemblies 18,44 are covered by a thin protective insulating layer (not shown) of PVC or other suitable material.

FIG. 5 is an electrical schematic diagram of the embodiment of the invention illustrated in FIGS. 1–4. Each inductor 30a–30h and its associated capacitor 36a–36h forms a parallel LC resonant circuit which is tuned to the output frequency of oscillator 50. Each LC resonant circuit 30a and 36a,30b and 36b, etc. is connected between its associated electrode zone 28a–28h and a decoder formed by associated diodes 38a–38h and capacitors 40a–40h. Thus, a dc signal appears across each capacitor 40a–40h as a function of amplitude of rf energy received at the associated electrode zone 28a–28h, which in turn is a function of capacitance between the various zones and plate 16, and thus of material level. When material is absent between plate 16 and electrode zone 28g, for example, the air therebetween forms a low-dielectric capacitor, and little rf energy is transmitted therebetween. The dc voltage across capacitor 40g is correspondingly low. However, when material rises to a level at which energy can travel through the material to electrode zone 28g—i.e., to a level which covers or partially covers zone 28g—substantial energy is received, resulting in a corresponding increase in voltage at capacitor 40g. This increase is not gradual, but jumps when material bridges plate 16 and zone 28g.

Threshold detector array 52 comprises a plurality of discrete threshold detectors 52a–52h each having one input connected to the associated capacitor 40a–40h and a second input connected to a common threshold-determining resistor 54. Resistor 54 is selected such that the voltage across capacitor 40g, for example, is below the threshold level when material is spaced from zone 28g, but jumps above the threshold level when material covers zone 28g. Although maximum dc level may vary with material conductivity, such variation does not affect operation as long as the maximum is above the threshold level. Thus, each threshold detector 52a–52h provides a digital output at one level—e.g., a high voltage level—when its associated signal input is above the preselected threshold level, and at a second level when its associated signal input is below the threshold level. The output of each detector 52a–52h is connected through an associated resistor 56a–56h to a junction 58, and thence to meter 55. A resistor 60 is connected across meter 55. Thus, resistors 56a–56h and 60 effectively form a summing resistor network 56 which provides an analog signal to meter 55 as a function of the sum of the discrete digital outputs of detectors 52a–52h.

The values of resistors 56a–56h are, of course, selected in coordination with each other and with resistor 60 such that the voltage to meter 55 varies in discrete stages or steps corresponding to electrode zone positions. For example, the total voltage at meter 55 corresponding to a level at zone 28a is equal to $V_{max}/8$ or $\frac{1}{8}$ full (assuming eight zones 28a–28g), while the voltage to meter 55 when material is at zone 28g would be equal to $7V_{max}/8$ or $\frac{7}{8}$ full. Below zone 28a, the meter would read zero or "empty," while at zone 28h the meter would read $V_{max}$ or "full." The number of measurement increments from "empty" to "full," and thus measurement resolution, corresponds to the number of electrode zones.

Figure 7:
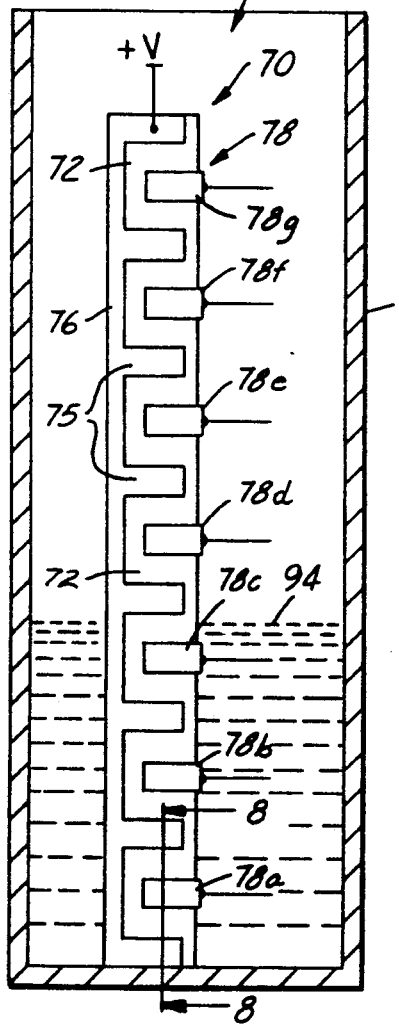
FIG. 7 illustrates a resistance-type probe for use in the system of FIG. 6.
Figure 8:
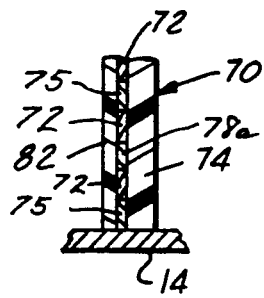
FIG. 8 is a fragmentary sectional view taken substantially along the line 8—8 in FIG. 7.

FIGS. 6–8 illustrate an embodiment 68 of the invention which employs a resistive-type probe 70 rather than the capacitance-type probe 12 in the embodiment of FIGS. 1–5. Probe 70 comprises a serpentine layer 72 of electrically resistive material deposited on a circuit-board substrate 74 (FIG. 8). A first array of electrical contacts 75 extends laterally from one edge of circuit-board 74 into the resistive-layer undulations, and are interconnected by the bus 76 which extends along the board edge. Bus 76 is connected to a voltage supply. An array 78 of discrete contacts 78a–78g project laterally from the opposing board side edge into the resistive-layer undulations in alternating sequence as compared with bussed contacts 75. Each contact 78a–78g is individually connected to a corresponding threshold detector 80a–80g (FIG. 6).

It will be noted in FIG. 7 that each adjacent pair of contacts 75 cooperates with bus 76 to substantially enclose one of the contacts 78a–78g in the plane of resistive layer 72. Thus, as schematically illustrated in FIG. 6, a resistance 72a–72g is effectively formed between each contact 78a–78g through resistive layer 72 and the immediately adjacent contacts 75 and section of bus 76. The serpentine configuration of resistive layer 72, complemented by the alternating and internested contact arrangement, substantially electrically isolates resistors 72a–72g from each other. A dielectric overlay 82 (FIG. 8) both protects the electrical probe elements from corrosion and prevents conduction through the fuel.

Each resistive probe element 72a–72g is connected through a corresponding resistor 84a–84g to ground. The signal input of each threshold detector 80a–80g is connected to the corresponding junction of these voltage dividers, and the reference inputs are connected in common to the junction of a reference divider 86–88. The outputs of detectors 80a–80g are connected through current limiting resistors 90a–90g and transistor switches 92a–92g to resistors 56a–56g of summing network 56.

When vessel 14 is empty, voltage drops across resistors 72a–72g are substantially identical and depend, in part, on temperature of each resistor and heat radiation into the vessel. As fuel rises within vessel 14, resistors which are immersed in fuel are cooled more efficiently than those above the fuel level. At level 94 in FIG. 7, for example, resistors 72a–72c are immersed and cooled more efficiently than resistors 72d–72g. The voltage drop across resistors 72a–72c will thus be greater than or less than that across resistors 72d–72g, depending upon whether positive or negative temperature coefficient material is employed in layer 72. It will be appreciated that the embodiment of FIGS. 6–8 is independent of electrical properties of the fluid, and thus provides consistent readings for both gasoline and gasohol (the difference in heat dissipation properties being negligible). Furthermore, the embodiment of FIGS. 6–8 exhibits reduced temperature sensitivity.

The invention claimed is:

1. A system for indicating level of material in a vessel comprising:
    resistance probe means including a plurality of electrically discrete resistor probes of electrically conductive construction positioned within the vessel in a spaced array extending height-wise of the vessel, said probes being characterized by having electrical resistances which vary as a function of heat dissipative coupling with material in the vessel,
    said resistance probe means comprising a continuous layer of resistance material on a planar rectangular substrate, said resistance layer being of serpentine contour height-wise of the vessel, and first and second opposed electrical contact means positioned in alternate undulations of said resistive layer height-wise of the vessel, said resistance layer and said contact means being carried on one face of said substrate,
    said first contact means comprising a first array of contacts extending from one edge of said substrate and being interconnected by an electrical bus which extends along said edge, said second contact means comprising discrete second contacts extending from an opposing edge of said substrate,
    first circuit means individually connected to said discrete probes and being responsive to variation of said electrical characteristics, and
    second circuit means coupled to said first circuit means and responsive to total variation of said electrical characteristics collectively at said probes for indicating level of material in the vessel adjacent to said probes.

2. The system set forth in claim 1 wherein each adjacent pair of said first contacts and that portion of said bus extending therebetween substantially encloses an opposing one of said second contacts.

3. A system for indicating level of material in a vessel comprising:
    a probe which includes a continuous strip of electrical resistance material on a substrate and extending height-wise of the vessel, and first and second arrays of electrical contacts disposed along opposite sides of said strip on said substrate, contacts of said first and second arrays being electrically alternately connected to said strip height-wise of the vessel, first circuit means including means connecting all contacts of said first array to a source of electrical power, means individually coupled to contacts of said second array and responsive to electrical resistance characteristics of individual sections of said strip between said alternately-connected contacts of said first and second arrays as a function of heat dissipative coupling of said strip sections to material in the vessel, and second circuit means coupled to said first circuit means and responsive to total variation of said resistance characteristics of said strip section connected in parallel to said first circuit means for indicating level of material in the vessel adjacent to said probe.

4. The system set forth in claim 3 wherein said second circuit means comprises threshold detection means individually responsive to said strip sections for providing digital output signals as a function of proximity of material in the vessel to individual said probe, and means for indicating material level in discrete steps as a function of said digital signals.

5. The system set forth in claim 4 wherein said second circuit means comprises a resistor summing network including a plurality of first resistors each having a firs terminal coupled to the output of an associated said threshold detection means and a second terminal connected to a common junction, and display means connected between said common junction and a source of electrical power.

6. The system set forth in claim 3 wherein said strip is of serpentine contour heightwise of the vessel, said contacts of said first and second arrays being disposed in alternate undulations of said strip.

7. The system set forth in claim 6 wherein said substrate is of planar rectangular construction, said strip and said contact arrays being carried on one face of said substrate.

8. The system set forth in claim 7 wherein said contacts of said first array extend from one edge of said substrate and are interconnected by an electrical bus which extends along said one edge, and wherein said contacts of said second array extend from an opposing edge of said substrate.

* * * * *